May 14, 1929.  P. J. MOORE  1,713,393
SHEARS
Filed Aug. 24, 1927
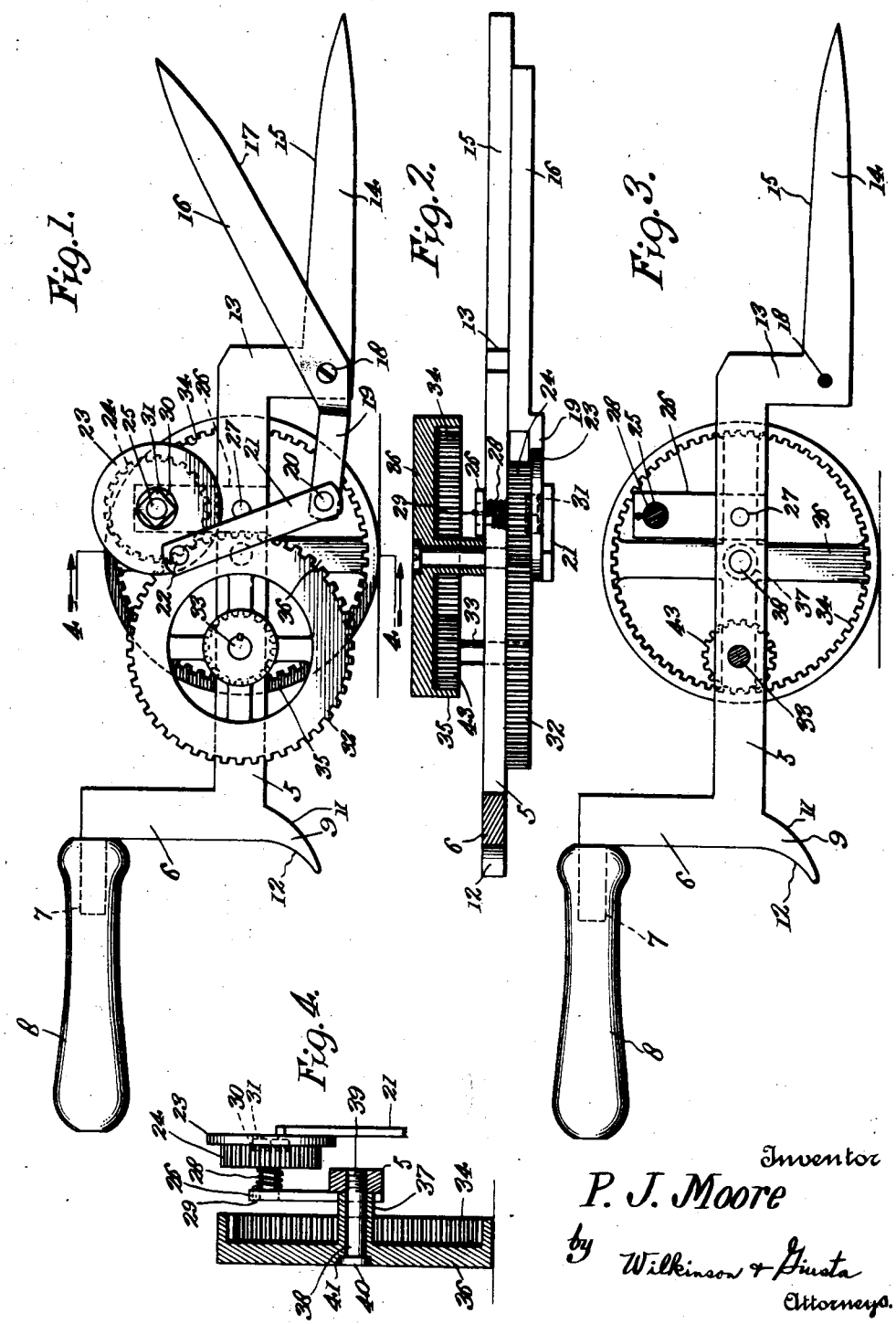
Inventor
P. J. Moore
by Wilkinson & Giusta
Attorneys.

Patented May 14, 1929.

1,713,393

UNITED STATES PATENT OFFICE.

PATRICK J. MOORE, OF BUTTE, MONTANA.

SHEARS.

Application filed August 24, 1927. Serial No. 215,193.

The present invention relates to improvements in shears and has for an object to provide an improved tailor's shears for cutting cloth and the like in which the action will be automatic and dependent merely upon the rolling of the device along the table or supporting surface.

Another object of the invention is to provide automatic shears in which a compact gear assembly possessing substantial weight with simplicity of construction is provided and wherein the shears will be subjected to tension whereby cutting will be sharp and even.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a side elevation of a pair of automatic shears constructed according to the present invention.

Figure 2 is a longitudinal central section taken horizontally through the device.

Figure 3 is a side elevation of the frame with the upper blade and certain of the gears removed, and Figure 4 is a vertical section taken on the line 4—4 in Figure 1.

Referring more particularly to the drawings, 5 designates the intermediate horizontal bar forming a portion of the frame of the machine. At one end this bar carries the upright shank 6 having extending outwardly and rearwardly therefrom the tang 7 to which the handle 8 is affixed. The arrangement of the shank gives the handle a substantial elevation over the bar 5. Extending downwardly from the bar 5 and beneath the shank 6 is a curved guard 9, the front wall 10 of which slopes downwardly and retreats away from the end of the bar 5. The inner wall 12 is of a somewhat similar conformation, although preferably struck on a smaller radius and a slightly different arc. This guard 9 will support the handle end of the device when the device is not grasped in the hand. It will also prevent the accidental lowering of the device in use beyond a low point dangerous to the hand and the sloping front wall 11 will encounter an obstacle and cause the handle end of the bar 5 to rise upwardly and over such obstacle. The inner wall 12 will conform to the hand and avoid the presentation of sharp surfaces. The incurved form of the guard 9 will tend to support the hand should the hand sag as the guard is offset behind the rear wall of the shank 6.

At the forward end, the bar 5 carries a downwardly extending arm 13 and this arm carries at its lower end the lower fixed blade 14 having the upper shearing or cutting edge 15.

The movable, cooperating blade is indicated at 16. Its cutting edge is represented at 17, such cutting edge cooperating with the upper cutting edge 15 of the lower blade 14. The blade 16 is pivoted, as indicated at 18 at the lower end of the arm 13 or inner portion of the lower blade 14. The movable blade 16 carries a tail piece 19 secured by the pivot 20 to the lower end of the link 21. The link is pivoted at its upper end upon the eccentric pin 22 of the disk 23. This disk 23 is affixed to, or formed as part of, a pinion 24 rotatably mounted upon the pin 25 which is mounted upon the bracket 26. This bracket is attached as by the rivet or other fastening 27 to the inner side of the horizontal frame bar 5 just forwardly of the central point thereof. The pin 25 projects outwardly from the bracket 26 across the frame bar 5 as shown in Figure 4. A coil spring 28 is wound about the pin 25 between the bracket 26 and pinion 24. The end 29 of the coil spring is secured to the bracket 26 to avoid its turning. The coil spring 28 is placed under tension and in its effort to expand forces the pinion 24 and its disk 23 outwardly against the washer 30 and its confining nut 31 threaded upon the pin 25.

Meshing with the pinion 24 is a gear wheel 32 mounted on a shaft 33 journaled through the frame bar 5 to the rear of the center thereof. This shaft 33 extends to both sides of the bar 5 and it carries also fixedly thereon a pinion 43 positioned in mesh with the internal circular rack 34 contained within a flange 35 of the supporting wheel 36. The wheel 36 is formed with the hollow sleeve 37 for receiving the axle pin 38 threaded at its outer end as indicated at 39 in Figure 4 to fit into the threaded opening in the central portion of the horizontal frame bar 5. The axle pin 38 is provided with a head 40 received in a countersunk recess 41 in the outer surface of the supporting wheel 36.

In operation, the supporting wheel 36 which is of comparatively large diameter holds the shears 14 and 16 a desirable distance above the table or other supporting surface, while the device is pushed along by the operator who grasps the handle 8 in one hand and manipulates the cloth with the other hand. As the device is rolled along upon the supporting wheel 36, the internal rack 34 of the supporting wheel will rotate the pinion 43 and shaft 36, imparting rotation also to the gear wheel 32 which meshes with and rotates pinion 24 carrying the eccentric disk 23. The rotation of this disk 23 is accompanied by an oscillation of the pitman or link 21 which gives rise to the vibration of the movable upper blade 16 of the shears. The spring 28 cushions and tensions the parts against vibration and rattle and it also presses the blade 16 against the blade 14, creating that desirable tension along the cutting surfaces that results in a good shearing action. The shears will be operated rapidly even on small movement of the device owing to the gear ratios.

It will be obvious that many changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

Automatic shears comprising a frame, a fixed shear blade thereon, a handle for moving said frame, an axle pin projecting from an intermediate portion of the frame, a supporting wheel having a hollow sleeve fitted on said pin, a flange on said wheel having a circular internal rack, a pinion meshing with said rack, a shaft for the pinion journaled in said frame, a gear wheel fixed to said shaft, a pinion disposed in mesh with said gear wheel, a pin on which said last mentioned pinion is journaled, an eccentric disk fixed to turn with said last mentioned pinion, a link connected to said eccentric disk, a movable blade fixed to the first blade and having a tail piece connected with said link, and a coil spring wound about said pin for developing tension upon said eccentric disk and its pinion and for subjecting the blade to lateral tension.

PATRICK J. MOORE.